US005466344A

United States Patent [19]
Lindke

[11] Patent Number: 5,466,344
[45] Date of Patent: Nov. 14, 1995

[54] METHOD AND APPARATUS FOR CONTROLLING WATER-BASED LIQUID WASTE

[75] Inventor: Paul A. Lindke, Penn Valley, Calif.

[73] Assignee: Houston Fearless 76, Inc., Compton, Calif.

[21] Appl. No.: 225,732

[22] Filed: Apr. 11, 1994

[51] Int. Cl.⁶ .............................. B01D 3/10; B01D 3/42; C02F 1/04
[52] U.S. Cl. ............... 202/205; 202/186; 202/202; 202/203; 203/1; 203/11; 203/87; 203/100; 203/DIG. 16; 203/DIG. 18; 210/260; 210/743
[58] Field of Search ................. 203/11, 87, 91, 203/100, DIG. 4, 1, DIG. 14, DIG. 18, DIG. 16; 202/205, 202, 203, 186; 159/DIG. 16; 210/294, 295, 260, 743, 760

[56] References Cited

U.S. PATENT DOCUMENTS

| | | | |
|---|---|---|---|
| 4,406,748 | 9/1983 | Hoffman | 202/233 |
| 4,556,456 | 12/1985 | Ruckriegel et al. | 202/202 |
| 4,834,836 | 5/1989 | Wemhoff | 159/23 |
| 4,846,934 | 7/1989 | Carberry | 202/202 |
| 4,900,403 | 2/1990 | Johnson | 202/205 |
| 4,940,134 | 7/1990 | Aoki et al. | 202/202 |
| 5,122,233 | 6/1992 | Zampieri | 202/202 |
| 5,126,050 | 6/1992 | Irvine et al. | 210/631 |
| 5,178,734 | 1/1993 | Palmer | 202/202 |
| 5,240,600 | 8/1993 | Wang et al. | 261/122.1 |

FOREIGN PATENT DOCUMENTS

0426929A1  9/1989  European Pat. Off. .

Primary Examiner—Virginia Manoharan
Attorney, Agent, or Firm—John P. Costello

[57] ABSTRACT

A pollution control apparatus (10) for controlling water-based liquid waste includes a vacuum distillation vessel (14) for separating water-based liquid waste into a distilled water component and a pumpable sludge component. A pH control system (12) allows the vacuum distillation vessel (14) to operate at maximum efficiency, and a purification system (22) allows the distilled water component to be purified to a level capable for reuse in chemistry, or else suitable for direct discharge into a municipal sewer. A microprocessor allows the apparatus (10) to operate automatically.

10 Claims, 5 Drawing Sheets

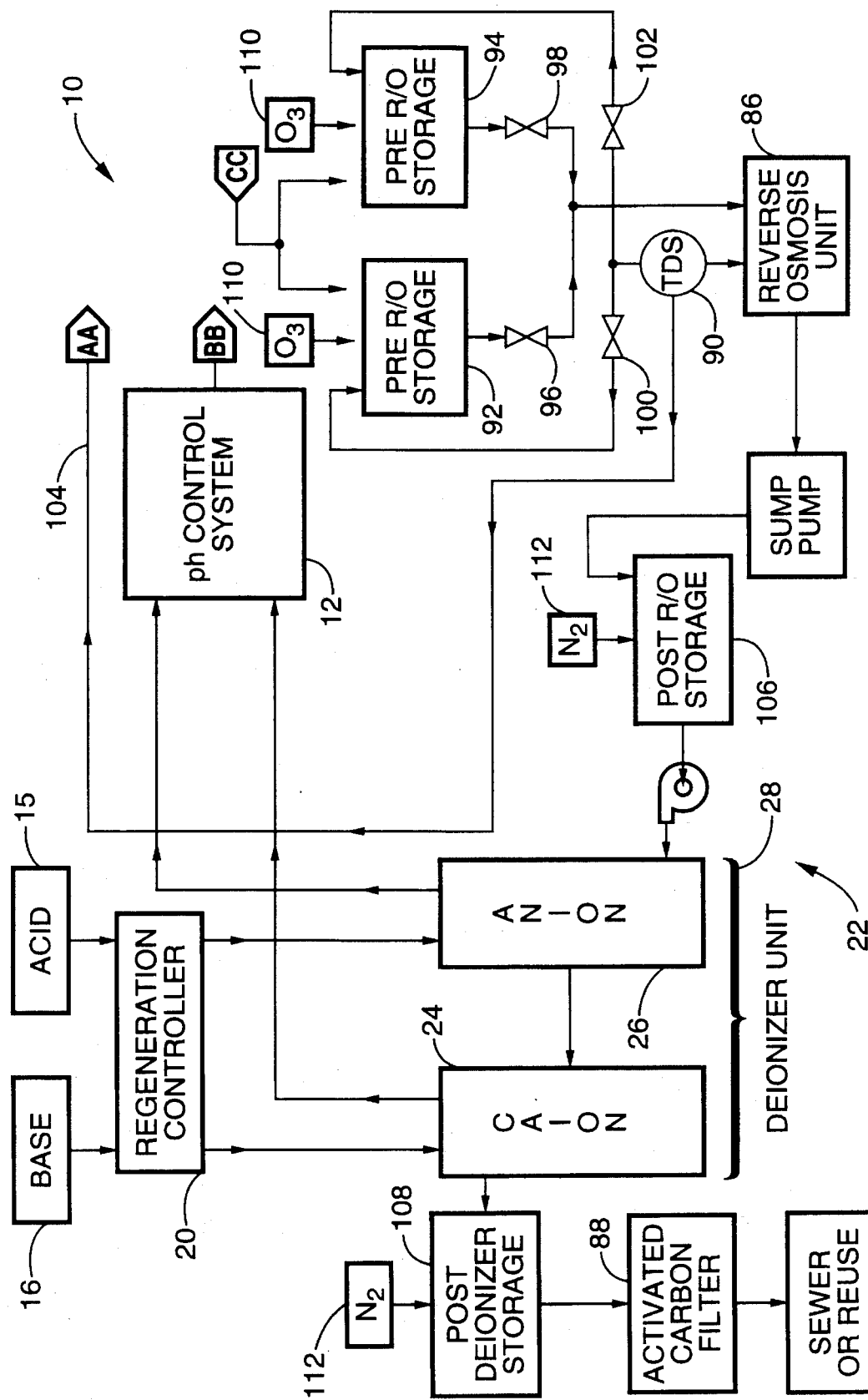
FIG.—1B

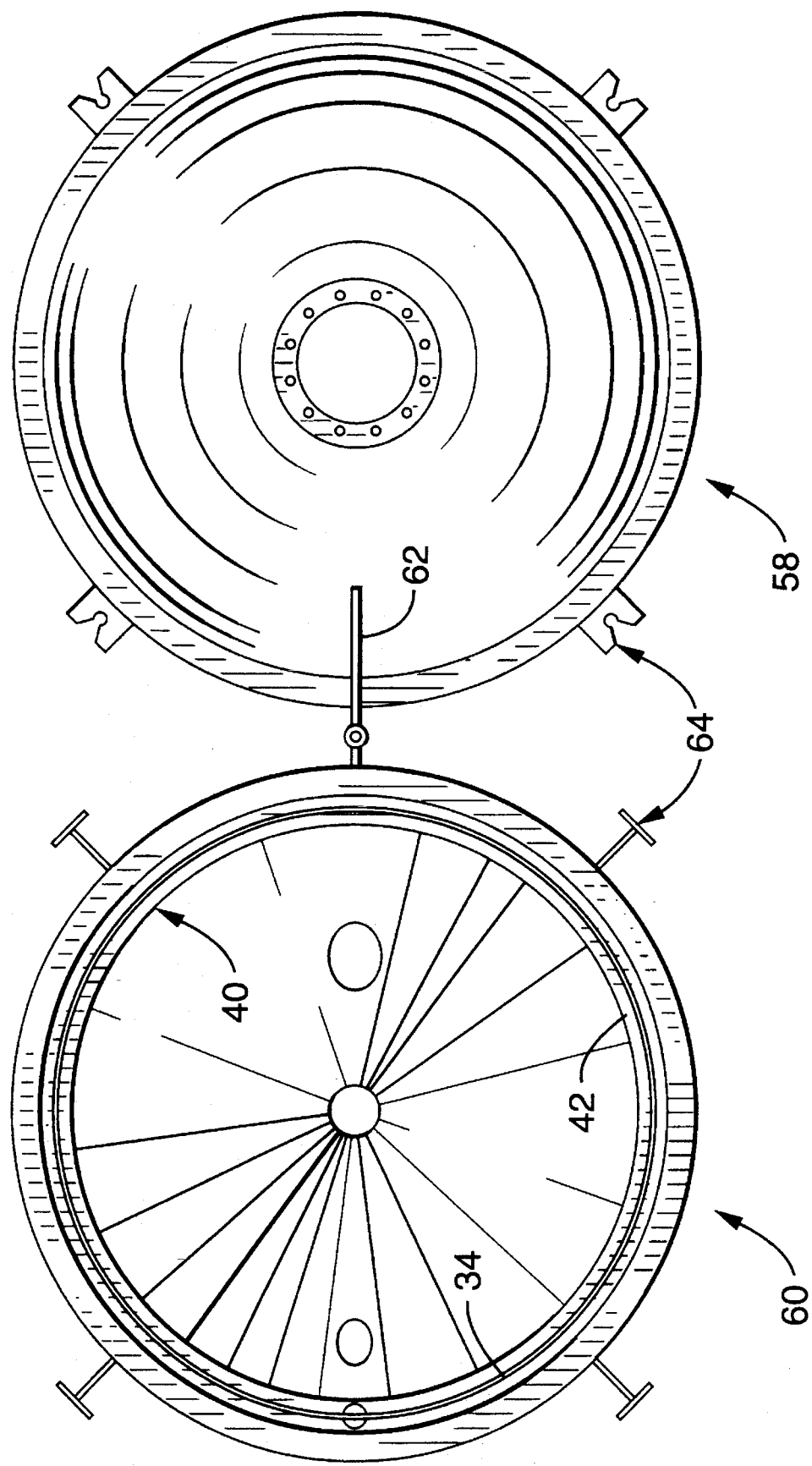
FIG.—4

METHOD AND APPARATUS FOR CONTROLLING WATER-BASED LIQUID WASTE

BACKGROUND OF THE INVENTION

1. Field of the Invention

This invention pertains generally to an apparatus for controlling water-based liquid waste and, more particularly, to an apparatus which employs a vacuum distillation vessel for separating water-based liquid waste into a pure, distilled water component and a waste sludge component.

2. Description of the Background Art

Due to increasingly stringent worldwide environmental laws pertaining to the handling and discharge of liquid waste materials, the design of new, highly efficient, liquid waste treatment devices are of critical importance. In the interest of conforming to new laws in this area, the manufacturing and processing services industry has experienced increased costs of operation and, increasingly, fines have been levied against industries for not meeting the standards set by the new laws.

A sampling of the industries affected by these increasingly stringent environmental laws include industries involved in photography, metal plating, printing, ink manufacturing, paint manufacturing, paper manufacturing, cosmetics, food processing, mining, mechanical, and other industries. A common aspect of the liquid waste streams which emanate from these types of industries, is that the wastes involved generally possess a high water composition, having dissolved solutes/waste therein, which makes it possible for devices to be applied to the liquid waste stream which separate the water fraction from the dissolved solute/waste fraction. By separating out and purifying the water fraction, the water can ideally be released into a municipal sewer system, and the dissolved solute/waste fraction can be concentrated into a sufficiently pumpable sludge component, for purposes of chemical recovery and/or subsequent disposal.

Currently used devices for separating water-based liquid waste into a dissolved solute fraction, and a substantially pure water fraction, generally involve the use of a vacuum distillation vessel. The typical vacuum distillation device operates by providing a low pressure atmosphere within the distillation vessel for achieving low temperature boiling of the raw, original, liquid waste solution. The low pressure atmosphere is generally maintained by a vacuum pump coupled to the vacuum distillation vessel. A refrigeration system provides a refrigeration circuit, consisting of a heat pump for heating the original liquid waste solution to boiling temperature, and a chiller for condensing water from vapor. The heat pump side of the refrigeration system functions by routing hot compressed freon gas through a heat exchanger, which provides the heat necessary for low temperature boiling of the original liquid waste solution. The chiller side of the refrigeration system is coupled to one or more condenser coils, which provide a cool surface within the vacuum distillation vessel, for condensing evaporated water resulting from boiling the liquid waste solution.

The refrigeration system used in a typical vacuum distillation device having a 1,600 gallon per day capacity, requires the use of a large compressor in the 44-horsepower range. This large compressor is required to keep the heat pump at a functioning level, during the start up cycle, while the chiller side of the refrigeration system comes up to a functioning level, to begin cooling. During start up, the temperature of the original liquid waste solution is brought up to a boiling level, through the operation of the heat pump. During this time, the chiller is not functioning at full capacity, so a "false load" must be created by the compressor to compensate, until the chiller side begins operating at a fully functional level. Without this "false load" applied by the compressor, the refrigeration system would cease to operate. The huge energy demand of such a large compressor, coupled with the mechanical complexity required in such a system, to facilitate the start up procedure, represents a significant drawback to this type of vacuum distillation device.

Once the refrigeration circuit is started, and the boiling process is underway, the water portion of the original liquid waste solution separates, and travels upward within the vacuum distillation vessel, in vapor form, until it contacts the cool condenser coils. Upon condensing, the water is in a distilled form having a residual dissolved solute concentration in the range of 2000 parts per million (ppm). This distilled water is subsequently pumped from the distillation vessel into a holding tank. The remaining solute fraction continues to undergo the boiling process within the vacuum distillation vessel, until enough water is removed, to concentrate the solute fraction to a pumpable sludge having a specific gravity of around 1.4. This sludge is then drained out of the vessel, and subsequently subjected to materials recovery methods and/or disposed of.

Due to increasingly stringent environmental laws around the world, it has become apparent that the 2000 ppm residual solute level achieved by current vacuum distillation devices is at a dissolved solute level considered by many standards to be too high for direct discharge into municipal sewer systems. Hence, additional treatment by a variety of separate methods is often required before the distilled water is pure enough for direct discharge.

It is also highly desirable in some industries to have a waste treatment apparatus which can separate the water component from the liquid waste solution, and treat it to a purity level high enough for reuse within the industrial facility, where it originated. By having water available for reuse, the relevant industry will be able to have pure water available for use in chemistry and other processes.

Moreover, current vacuum distillation devices suffer from a lack of evaporative efficiency, such that it often takes an excessively long time for the water component in a defined volume of the original liquid waste solution to completely separate from the solute component, such that the solute component is finally reduced to a pumpable sludge having a specific gravity of around 1.4.

Another desirable feature lacking in current vacuum distillation devices involves controlling the escape of hazardous gasses from the original liquid waste solution. This problem is especially prevalent in photo-chemical waste processing. Water-based photo-chemical wastes contain a high degree of dissolved silver, and additionally, contain dissolved ammonium sulfate. The silver is easily removed by a silver recovery unit, but the dissolved ammonium sulfate creates a significant health and safety problem, by releasing from the original photo-chemical waste solution in the form of a gas. This ammonium sulfate gas can leak from the vacuum distillation vessel and/or waste holding tank, and upon being inhaled by humans, can cause significant ill effects. It is therefore desirable to have a vacuum distillation device which prevents the leakage of hazardous gasses, such as ammonium sulfate.

Additionally, it is desirable for a vacuum distillation device to operate as economically as possible. If such a device uses more energy than needed to evaporate the original liquid waste solution, this translates into added costs to the business sector. Hence, new designs are constantly being sought to make vacuum distillation devices as economical and as energy-efficient as possible.

Another problem inherent in current vacuum distillation devices is the problem of controlling the growth of microorganisms and algae in the distilled water component after it leaves the vacuum distillation vessel, and is stored in a holding tank. These microorganisms and algae are collectively called "bio-slime" and their existence significantly downgrades the purity of the distilled water component, as well as creates problems by clogging pipes, valves and other mechanical components of the typical vacuum distillation device. Current methods of bio-slime control involves adding chemicals to the distilled water storage tank, to retard their growth. However, by adding chemicals, the purity of the distilled water is downgraded, further.

In summary, known vacuum distillation devices have become increasingly unable to achieve the levels of distilled water purity which comply with current and future environmental standards. Normal residual dissolved solute contamination in the distilled water component, coupled with bio-slime growth, and introduced chemicals to control such growth, have resulted in the distilled water component being too contaminated to be released directly into municipal sewers, or available for reuse, without additional treatment. It has also become necessary to provide a waste treatment apparatus which controls the escape of hazardous gasses. Additionally, business economics have dictated that a more energy efficient vacuum distillation device be developed. The present invention successfully overcomes the deficiencies inherent in current vacuum distillation devices by providing a waste treatment apparatus based on a vacuum distillation device, having increased evaporative efficiency, that is both economical and compliant with modern environmental laws.

The foregoing discussion reflects the state of the art of which the applicant is aware and is tendered with a view toward discharging applicant's acknowledged duty of candor in disclosing information which may be pertinent to the examination of this application.

SUMMARY OF THE INVENTION

According to the present invention, the foregoing and other objects and advantages are attained by providing a waste treatment apparatus which includes three primary components: (1) a vacuum distillation vessel; (2) a pH control system; and (3) a purification system.

The vacuum distillation vessel component of the apparatus is designed for easy access, wherein the top portion of the distillation vessel can be uncoupled from the bottom portion, for purposes of repair and cleaning. A bank of electrical resistance heaters provide heat for boiling any liquid waste solution. A vacuum device coupled to the distillation vessel provides a low pressure atmosphere within the vessel for low-temperature boiling. In accordance with one aspect of the invention, one or more condenser pipes from a refrigeration system are coupled to a manifold, which allows the pipes to enter the vacuum distillation vessel, separately. The condenser pipes are coupled to the inside perimeter of the distillation vessel, and are positioned above a liquid collection tray, which collects the distilled water component of the liquid waste.

In accordance with another aspect of the invention, a second, energy-free, condensation surface, in addition to the refrigeration condenser pipes, is coupled to the distillation vessel, in such a fashion that a steady flow of vapor from the interior of the boiling vessel contacts this second condensation surface, and condenses. It has been found that devices known as "combination separator traps" provide just such an energy-free condensation surface. Combination separator traps are essentially comprised of one or more plastic vanes suspended inside a container wherein the vapor from the boiling vessel rises and contacts the vanes, causing the vapor to condense, without expending additional energy. The distilled water from the condenser pipes, as well as from the combination separator traps, is then pumped into the purification system.

In accordance with the invention, the refrigeration system and the resistance heaters are separate components of this waste treatment system, which significantly reduces the mechanical complexity of this system, and obviates the necessity of having a large refrigeration compressor to place a "false load" upon the refrigeration system, for start-up purposes. As a result, since the refrigeration compressor is not required to provide both the heating and cooling functions, a small refrigeration compressor can be used, resulting in a large energy savings.

In accordance with another aspect of the invention, the purification system receives the distilled water from the vacuum distillation vessel and further purifies the water to a level of purity high enough to be directly discharged into a municipal sewer, or else recycled back into the industrial facility, which produced the original waste, for remixing new chemical solutions. If the distilled water is recycled back into the industrial facility, the apparatus is referred to as a "zero discharge" system, because no water or waste is ever discharged into a municipal sewer. In such a "zero discharge" scenario, the sludge component is disposed of at an appropriate waste site and the distilled water component is totally recycled.

The purification system may include any combination of a reverse osmosis unit, a deionizer unit, or an activated carbon filter, depending on the pollution level and type of liquid waste being treated. For example, a waste stream from a food processing plant may only have organic particulate matter to be removed, and reverse osmosis alone may render such a waste stream pure enough for discharge into a municipal sewer. However, a photo-chemical waste stream may require more aggressive cleansing to achieve a high purity level, and therefore, require reverse osmosis, deionization, and carbon filtration. In the case of photo-chemical wastes, this purification system is capable of rendering the distilled water received from the vacuum distillation vessel at 2000 ppm, to a final concentration of below 100 parts per billion (ppb). Therefore, this vacuum distillation device can be engineered to meet the specific needs of any industry in meeting any environmental quality standard.

In accordance with another aspect of the invention, a pH control system has been added for adjusting the pH level of the original liquid waste solution to an optimum pH range of between 5.5 and 6.5. If the liquid waste is adjusted to within the pH range of 5.5 to 6.5, the highest evaporative efficiency is achieved within the distillation vessel, resulting in a faster waste treatment cycle. This pH control system uses a portion of the regeneration solutions from the deionizer unit to control the pH of the original liquid waste solution. These regeneration solutions are comprised of the distilled water mixed with acid and base, and are first used for regenerating the deionization beads. Subsequently, these regeneration solutions are cycled through the pH control system for adjusting the pH of the original liquid waste solution. An automatic detector in the pH control system detects the pH of the liquid waste solution, and adds the appropriate amount of regeneration solutions, until the liquid waste solution reaches an optimum level of between 5.5 and 6.5.

In accordance with another aspect of the invention, ozone gas infusion and nitrogen gas infusion is introduced, to control the escape of ammonium sulfate gasses, and other gasses, and to control bio-slime growth in the original solution and purified water component. By controlling bio-slime through gas infusion, the necessity to control bio-slime through the use of harsh chemicals is obviated, thus preserving, the cleanliness of the distilled water component. Additionally, chilling the distilled water has proven to aid in controlling the growth of bio-slime and the escape of gasses.

It is an object of this invention to provide a waste treatment apparatus which purifies the water component to a level of purity sufficient for total reuse, or for direct discharge into a municipal sewer system.

Another object is to provide a waste treatment apparatus having a vacuum distillation vessel capable of easy access for purposes of maintenance and cleaning.

Another object of this invention is to provide a waste treatment apparatus which reuses the deionization unit regeneration chemicals for adjusting the pH level of the original liquid waste stream for purposes of maximizing evaporative efficiency.

A further object is to provide an energy-efficient waste treatment apparatus which employs a secondary, energy-free, condensation surface.

Another object is to provide a waste treatment apparatus which has a separate refrigeration system and heating system, thereby reducing energy requirements, as well as the mechanical complexity of the apparatus.

An additional object is to provide a waste treatment apparatus which effectively controls the escape of hazardous gasses from the liquid waste stream.

A still further object of this invention is to provide a waste treatment apparatus which allows for the control of bio-slime in the distilled water component, without the addition of purity-reducing, harsh, chemicals.

Still other objects and advantages of the waste treatment apparatus described herein will become readily apparent to those skilled in this art from the following detailed description, wherein only the preferred embodiment of the apparatus have been shown and described, simply by way of illustration of the best mode contemplated of carrying out the invention. As will be realized, the waste treatment system is capable of other and different embodiments and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The invention will be more fully understood by reference to the following drawings which are for illustrative purposes only:

FIGS. 1A and 1B are functional block diagrams with schematic representations of the components comprising the waste treatment apparatus of the present invention.

FIG. 4 is a plan view of the vacuum distillation vessel, illustrating the top portion of the vessel uncoupled from the bottom portion.

DESCRIPTION OF THE PREFERRED EMBODIMENT

Figure 1A:
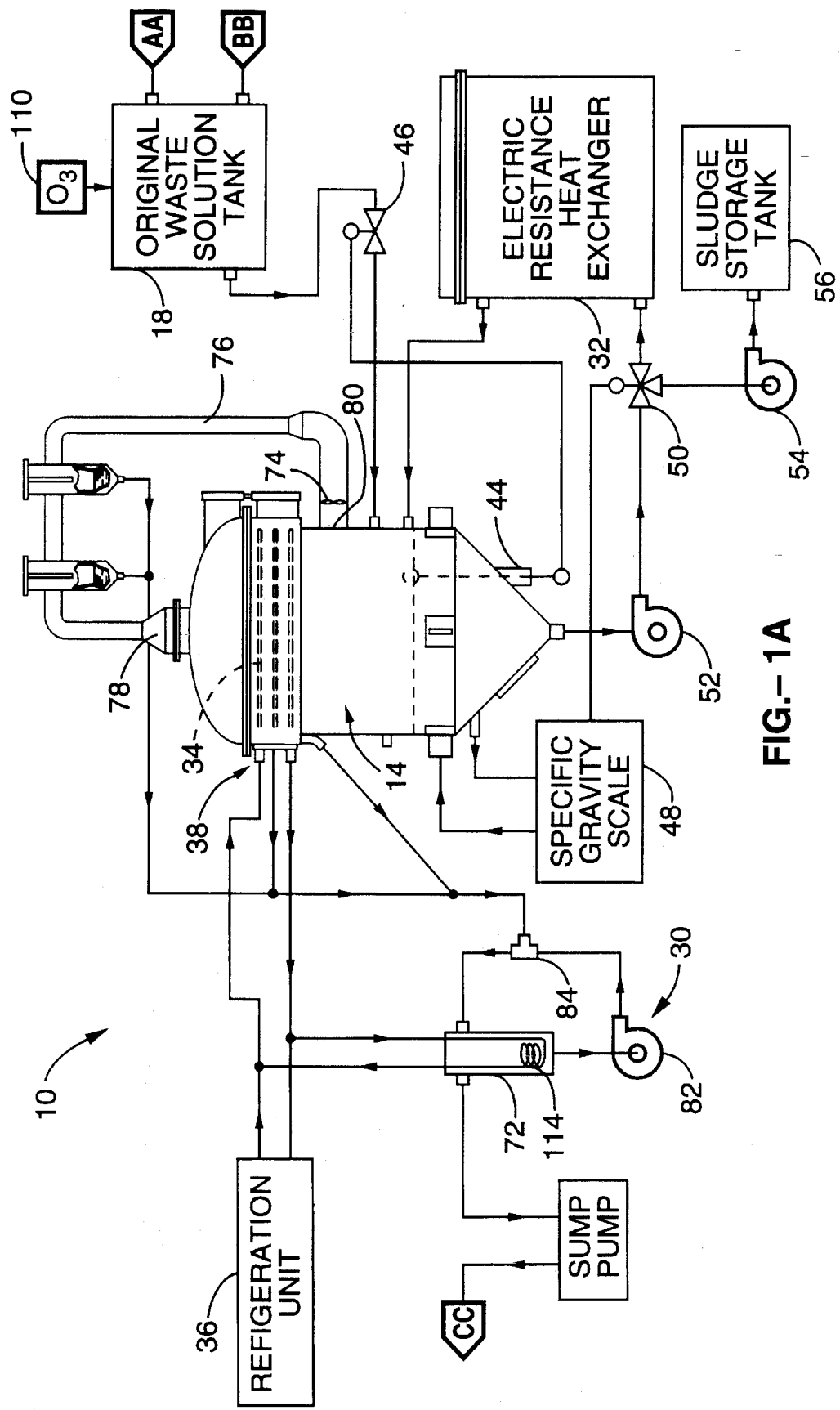

Referring more specifically to the drawings, for illustrative purposes, the waste treatment apparatus 10 of the present invention, is shown in FIGS. 1A and 1B. Apparatus 10 provides for the rendering of any water-based based liquid waste into a highly purified water component, suitable for reuse, or for direct discharge into a municipal sewer, and a sludge component, which is subsequently subjected to materials recovery methods and/or disposed of.

A pH control system 12 acts upon the original liquid waste solution prior to its entry into a vacuum distillation vessel 14. It has been found that by adjusting the pH level of the original liquid waste solution to a range of between 5.5 and 6.5, that evaporative efficiency is greatly increased. By increasing the evaporative efficiency of the original liquid waste solution, the speed of treating a defined volume of liquid waste is increased, thus allowing a greater volume of liquid waste to be treated, in a defined amount of time. pH control system 12 is equipped with a meter for sensing the pH level of the original liquid waste solution. If the pH of the liquid waste solution is above or below the optimum range of 5.5 to 6.5, the pH meter detects this, and signals pH control system 12 to introduce an appropriate quantity of acid 15 or base 16, to the original waste solution tank 18, for purposes of bringing the liquid waste solution to within the optimum range. The acid 15 and base 16 originate from the regeneration controller 20 of purification system 22. The acid 15 and base 16 are used for regenerating the deionization beads located in the cation 24 and anion 26 of deionizer unit 28. Subsequently, these acid-base fortified regeneration solutions can be used by the pH control system 12 for maintaining the pH of the original liquid waste solution to within the optimum level.

Once the original liquid waste solution has reached the optimum pH level, it is introduced from waste solution tank 18, into vacuum distillation vessel 14 to be brought up to a low-temperature boiling point and subsequently separated into a distilled water component and a sludge component. Low temperature boiling is achieved by: (1) reducing the interior pressure of vacuum distillation vessel 14 through usage of an aspiration vacuum device 30 and (2) heating the original liquid waste solution to a low-temperature boiling point by using an electric resistance heat exchanger 32.

Upon reaching the low temperature boiling point, the original liquid waste solution separates into a watery vapor and a pumpable sludge having a specific gravity of around 1.4. The watery vapor condenses upon a plurality of refrigerator condenser coils 34 coupled to the interior of vacuum distillation vessel 14. Upon condensation, the watery vapor is converted to a distilled water component having a dissolved solute concentration of around 2000 ppm.

Figure 2:
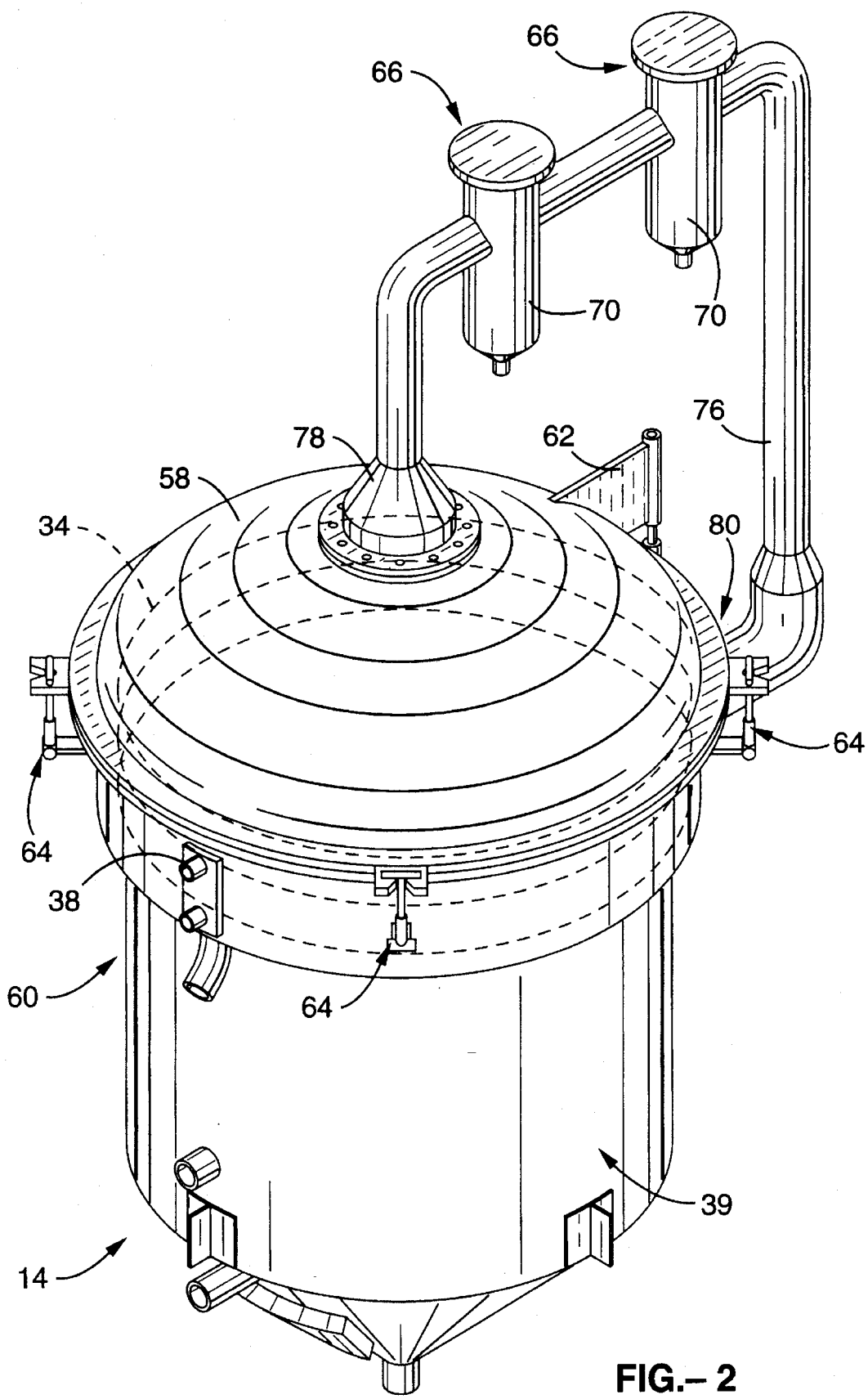
FIG. 2 is a perspective view of the vacuum distillation vessel and secondary condensers of the preferred embodiment.
Figure 3:
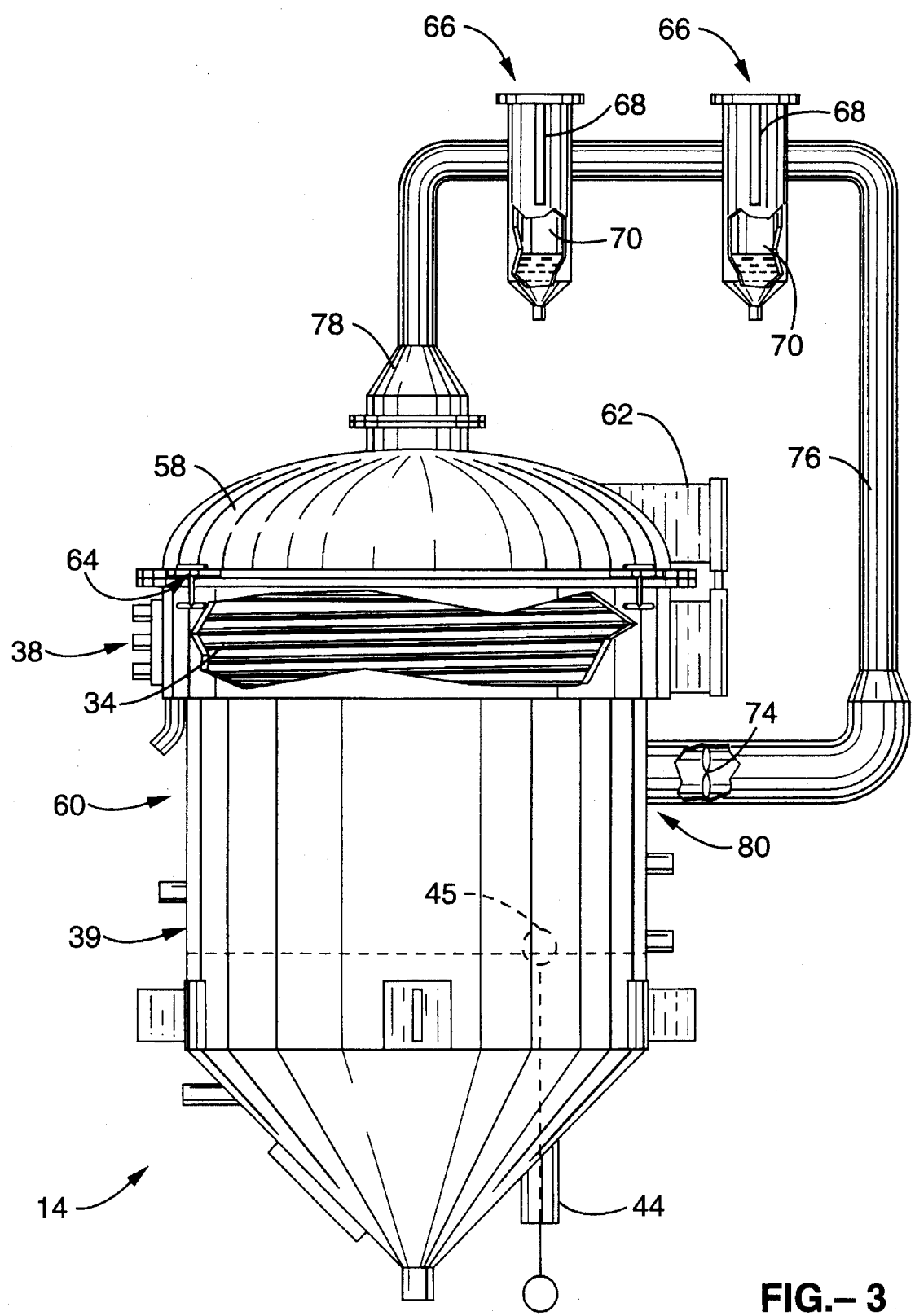
FIG. 3 is a side elevation view of the distillation vessel and secondary condensers shown in FIG. 2, illustrating the interior of the secondary condensers and the condenser coils in cutaway view.

Still referring to FIGS. 1A and 1B, and additionally referring to FIG. 2 and FIG. 3, vacuum distillation vessel 14 of the present invention, can be more closely examined. A plurality of electric resistance heaters are contained within electric resistance heat exchanger 32. The original liquid waste solution is recirculated from vacuum distillation vessel 14 to heat exchanger 32 and back to distillation vessel 14, applying enough heat to the original liquid waste solution to affect boiling. It is preferable that the resistance heaters be constructed from a non-corrosive material such as titanium, to withstand the corrosive effects of the original liquid waste solution, which they become immersed in. Closer to the top of vacuum distillation vessel 14 refrigeration condenser coils 34 are coupled separately to refrigeration unit 36 by way of manifold 38 which is coupled to the outside perimeter 39 of distillation vessel 14. This arrangement of separate condenser coils 34 has proven to provide a more efficient cooling surface for condensing the vapor to a distilled water component. Singular condensation coils having the same cooling surface area as the separate condenser coils 34 just described, tend to heat up at the end farthest from the refrigeration compressor, thus providing a less efficient cooling surface. By using separate condenser coils 34, this problem is obviated.

Referring additionally to FIG. 4, the largest amount of cooling surface area is obtained by using condenser coils 34, which approximate the shape of the inside perimeter 40 of vacuum distillation vessel 14. For example, if distillation vessel 14 is substantially circular, then it is best to incorporate condenser coils 34 having a substantially circular shape, which couple intimately to the inside perimeter 40 of distillation vessel 14. By maximizing the size of the available cooling surface, a higher rate of distillation of the vapor component is achieved, thus increasing the speed by which the original liquid waste solution is treated.

A distilled water capture tray 42 is coupled to the inside perimeter of distillation vessel 14 in direct alignment below condenser coils 34 for purposes of capturing the distilled water, as it drips off of condenser coils 34.

A liquid level switch 44 within distillation vessel 14 automatically maintains the proper level of the liquid waste solution within distillation vessel 14. As the liquid waste solution boils off, liquid level switch 44 detects a drop in the fluid level indicator 45 inside distillation vessel 14, and automatically activates a solenoid valve 46, which opens, and the vacuum within distillation vessel 14 creates suction, which causes more original liquid waste solution from waste solution tank 18 to fill up distillation vessel 14. Once distillation vessel 14 is sufficiently full, liquid level switch 44 closes solenoid valve 46.

A specific gravity scale 48 is coupled to distillation vessel 14 for purposes of determining whether the sludge component inside distillation vessel 14 has been concentrated to a specific gravity of around 1.4. Once the sludge has reached this density, it is still pumpable, and specific gravity scale 48 signals a three-way solenoid valve 50 to open, and direct the sludge, first through a recirculation pump 52, and finally through a sludge transfer pump 54, which transfers the sludge to a sludge storage tank 56.

During normal operation, three-way solenoid valve 50 directs a regular cycling of the liquid waste solution through recirculation pump 52, through heat exchanger 32, and finally, back into distillation vessel 14. In this way, the liquid waste is constantly agitated, which increases evaporative efficiency, and prevents the solute component of the liquid waste solution from caking or plating on the interior surfaces of distillation vessel 14.

The body of distillation vessel 14 is preferably constructed from stainless steel, or other non-reactive material. Additionally, the interior of distillation vessel 14 must be made readily accessible for purposes of cleaning and repair.

By providing a distillation vessel 14 wherein a top portion 58 uncouples from a corresponding bottom portion 60, this goal of easy maintenance can be achieved. A weight bearing, swing-away hinge 62, or the like, is sufficient for aiding in removing and replacing top portion 58 of distillation vessel 14. A plurality of clamps 64 are employed for ensuring that top portion 58 is securely coupled upon bottom portion 60 in an air-tight arrangement.

By not requiring refrigeration unit 36 to perform both the heating and cooling duties required by the vacuum distillation process, a much smaller refrigeration compressor can be used, thus significantly reducing the energy demand and mechanical complexity of apparatus 10. A 2000 gallon per day distillation vessel 14 of the present apparatus 10 requires only a 10 horsepower compressor, to operate effectively. This is because apparatus 10 of the present invention delegates the heating and cooling duties separately to heat exchanger 32 and refrigeration unit 36. Because the heating and cooling functions are separated, a large compressor is not required to maintain a "false load" upon the refrigeration unit 36 during the start-up cycle.

For apparatus 10, the start-up merely involves activating all the resistance heaters inside heat exchanger 32 until the original liquid waste solution reaches a temperature of around 80 degrees Fahrenheit, which is sufficient for low-temperature boiling. Once this boiling temperature has been reached, one or more of the resistance heaters may be switched off, leaving on only those heaters required to maintain the liquid waste solution at the boiling temperature. Once the liquid waste solution has been vaporized, refrigeration unit 36 can begin cooling condenser coils 34 for purposes of turning the vapor into distilled water.

Additional energy savings is incorporated into apparatus 10 by coupling a plurality of secondary, energy-free, condensers 66 to vacuum distillation vessel 14. Examples of energy-free condensers 66 sufficient to meet the requirements of this invention are devices known in the art as COMBINATION SEPARATOR TRAPS, manufactured by Clark-Reliance Corp. The typical combination separator trap operates by providing a plastic condensing vane 68 coupled within a cup-like vessel 70. Upon contacting the water vapor, condensing vane 68 condenses the water vapor to distilled water, which is subsequently captured by cup-like vessel 70. The distilled water may then be pumped into a distilled water storage tank 72. It is best for the energy-free condensers 66 to be positioned within a ventilation circuit 76, which in turn is coupled- upon distillation vessel 14 at a location which provides a steady stream of water vapor from the interior of distillation vessel 14. Additionally, the steady stream of water vapor is facilitated by positioning a fan 74 in ventilation circuit 76 which has a first end 78 for receiving vapor, and a second end 80 for returning the "dried air" to distillation vessel 14 after the water vapor has been removed by energy-free condensers 66. By positioning fan 74 at second end 80, fan 74 enjoys long life, as the dry air at this point is essentially devoid of any water vapor which might damage fan 74.

Energy-free condensers 66 additionally open up the possibility that a small enough apparatus 10 of the present invention, could operate completely energy free, at least with regard to the condensing/cooling function. Such a small apparatus 10 is envisioned for small production facilities having a daily liquid waste production of 500 gallons, or less.

Upon condensing, the distilled water from the condenser coils 34 and energy-free condensers 66 is pumped by aspiration vacuum device 30 into distilled water storage tank 72. Aspiration vacuum device 30 includes a vacuum pump 82 and a venturi system 84. Venturi system 84 allows the distilled water to bypass vacuum pump 82 on its journey into distilled water storage tank 72. By pumping the distilled water through venturi system 84, the corrosive action of the distilled water upon vacuum pump 82 is avoided, thus allowing this component of apparatus 10 to enjoy longer life.

Upon entering distilled water storage tank 72, the distilled water is next subjected to purification system 22. The objective of purification system 22 is to treat the distilled water until it reaches a purity level sufficient for reuse or direct discharge into any municipal sewer system. If the distilled water is to be reused, it is not discharged into a municipal sewer, but is instead cycled back into the industrial facility which produced the original waste, to be used for mixing chemistry, or the like. Such a closed-loop system is considered to be a "zero discharge" system, since nothing is discharged into a municipal sewer.

Purification system 22 includes three basic components: (1) a reverse osmosis unit 86; (2) a deionizer unit 28; or (3) an activated carbon filter 88. These three components are available in off-the-shelf form, and can be purchased from common sources, however, such a system of components has not been coupled to a vacuum distillation vessel 14 to result in a genuine "zero discharge" waste treatment apparatus 10 of the present invention. It is also a feature of purification system 22 that only one or two of the three major components need to be used, depending on the type of liquid waste, and the corresponding level of technology required to render the waste to a "zero discharge" level. By being able to adapt the system to a particular waste stream, the relevant industry saves significant costs by having to purchase only the components needed for its particular requirements.

The preferred sequence of treatment through purification system 22 is that the distilled water be first subjected to reverse osmosis unit 86, then deionizer unit 28 and lastly, activated carbon filter 88. It should also be noted that several peripheral components of purification system 22 have been included for increasing the life span of purification system 22, significantly. The first of these peripheral components is a total dissolved solids (TDS) meter 90 coupled to reverse osmosis unit 86. As the distilled water cycles from pre-reverse osmosis storage tanks 92, 94, facilitated by valves 96, 98, 100, 102, and through reverse osmosis unit 86, TDS meter 90 detects whether the particles entering reverse osmosis unit 86 are too large to pass through the osmosis membrane located within reverse osmosis unit 86. If the particles are too large, a pump inside of reverse osmosis unit 86 activates, and pumps the particles from reverse osmosis unit 86 back to the original liquid waste solution tank 18, by return line 104. These particles are then cycled through vacuum distillation vessel 14 and are sedimented into the sludge on the second pass. TDS meter 90 thus protects the reverse osmosis membrane from becoming overloaded and rupturing. It has been found that by using TDS meter 90, a reverse osmosis membrane subjected to normal use will easily last a year, before requiring a change-out.

Additionally, deionizer unit 28 is protected by regeneration controller 20 which passes acid 15 or base 16 into deionizer unit 28 for purposes of periodically washing the deionization beads present within the deionizer unit 28. Deionizer unit 28 operates by filtering out particles from the distilled water on the basis of charge. The beads possess either a cationic 24 or an anionic 26 charge, and capture particles on this basis, as they pass through deionizer unit 28. After a time, the beads reach a saturation point, and must be washed with acid 15, or base 16, to release the particles from the beads. By periodically recycling the beads in this way, deionizer unit 28 experiences significantly increased life. Under normal use, the beads become saturated and require regeneration by regeneration controller 20 every three months. By regenerating the beads every three months with regeneration controller 20, significantly increase bead life is attainable. However, regeneration controller 20 also operates in conjunction with pH control system 12, as discussed previously, and operates continuously whenever pH control is required.

Purification system 22 typically cycles the distilled water through one or more storage tanks 92, 94, 106, 108. Within these storage tanks, algae growth and bio-organism growth typically occurs. This organic growth, typically referred to as "bio-slime", presents a significant problem by clogging the components of purification system 22 and generally downgrading the purity of the distilled water. To solve this problem, the infusion of ozone 110 and nitrogen 112 gasses at strategic points, within purification system 22, has proven to be efficacious. Ozone 110 and nitrogen 112 gas infusion has been found to effectively eliminate bio-slime growth, without downgrading the purity of the distilled water.

Additionally, ozone 110 and nitrogen 112 gas infusion, coupled with the use of a chiller 114 for chilling the distilled water, has proven effective in controlling the escape of hazardous gases from the waste treatment apparatus 10 of the present invention. Chiller 114 is coupled to the same refrigeration unit 36 which supplies condenser coils 34. This feature has proven to be especially efficacious in controlling the escape of ammonium sulfate gas, which is a typical hazardous by-product of photo-chemical waste. Additionally, ozone 110 is added to the original waste solution tank 18 for purposes of controlling odor.

Additionally, it is envisioned that the entire liquid waste treatment apparatus 10 presented herein will be of completely automatic operation, save for routine maintenance. A microprocessor will automatically regulate the operation of distillation vessel 14. Functions related to distillation vessel 14, such as introducing liquid waste from waste solution tank 18, activating electric resistance heat exchanger 32 to heat the liquid waste, and activating condenser coils 34, would all be regulated by the microprocessor. Other components such as reverse osmosis unit 86 and deionizer unit 28 could operate automatically through mechanical means well known in the art, without the aid of the microprocessor. Many off-the-shelf microprocessors currently available will suffice to accomplish the regulation of distillation vessel 14 such as those microprocessors produced by Allen-Bradley, Inc.

Accordingly, it will be seen that this invention provides for a waste treatment apparatus which is capable of rendering any water-based waste into a pumpable sludge component and a pure water component clean enough for reuse or for direct discharge into a municipal sewer.

Although the description above contains many specificities, these should not be construed as limiting the scope of the invention-but as merely providing illustrations of some of the presently preferred embodiments of this invention. Thus the scope of this invention should be determined by the appended claims and their legal equivalents.

I claim:

1. A waste control system for the recovery and concentration of water-based pollutant materials, comprising:

(a) A low-temperature distillation vessel for separating said pollutant materials into a vapor component and a sludge component;

(b) said distillation vessel having a top portion and a bottom portion, an inside perimeter and an outside perimeter, said distillation vessel further having means for uncoupling said top portion from said bottom portion;

(c) electric resistance heating means for heating said pollutant materials to a sufficient boiling temperature;

(d) a first, energy-dependent condensation means for condensing said vapor component into a liquid component, said first condensation means coupled to said inside perimeter of said distillation vessel;

(e) a liquid recovery tray for capturing said liquid component from said first condensation means, said liquid recovery tray coupled to said inside perimeter of said distillation vessel in direct alignment below said first condensation means;

(f) a second, energy-free condensation means for condensing said vapor component into a liquid component, said second condensation means communicating with said distillation vessel to receive a steady flow of said vapor component;

(g) purification means for purifying said liquid component received from said first and second condensation means;

(h) aspiration vacuum means for drawing said liquid component recovered from said first and second condensation means into said purification means;

(i) said aspiration vacuum means additionally providing a vacuum inside said distillation vessel;

(j) pH control means for controlling the pH of said pollutant material at a level whereby maximum boiling efficiency is achieved.

2. The waste control system of claim 1, wherein said purification means is a reverse osmosis unit, a deionizer unit or an activated carbon filter.

3. The waste control system of claim 1, further comprising microprocessor control means for controlling the operation of said distillation vessel.

4. The waste control system of claim 1, further comprising means for controlling bio-slime within said liquid component.

5. The waste control system of claim 4, wherein said means for controlling bio-slime within said liquid component includes infusing nitrogen gas or ozone into said liquid component.

6. The waste control system of claim 1, further comprising means for controlling escape of hazardous gasses.

7. The waste control system of claim 6, wherein said means for controlling escape of hazardous gasses includes chilling said liquid component and infusing ozone gas into said liquid component.

8. The waste control system of claim 1 wherein said energy free condensation means is a plurality of condensing vanes for condensing said vapor component into a liquid component.

9. The waste control system of claim 1, wherein said pH control means maintains said pollutant materials at a pH level of between 5.5 to 6.5.

10. A zero discharge system for controlling water-based liquid waste, comprising:

(a) A low-temperature distillation vessel for separating said liquid waste into a vapor component and a sludge component, said distillation vessel being substantially circular in cross section;

(b) said distillation vessel having a top portion and a bottom portion, an inside circular perimeter and an outside circular perimeter, said distillation vessel further having means for uncoupling said top portion from said bottom portion;

(c) electric resistance heating means for heating said liquid waste to a sufficient boiling temperature;

(d) a plurality of condenser tubes for condensing said vapor component into a liquid component, said condenser tubes formed in a substantially circular shape to couple with said circular inside perimeter of said distillation vessel, said condenser tubes coupled to a refrigeration unit;

(e) a liquid recovery tray for capturing said liquid component, said liquid recovery tray coupled to said inside perimeter of said distillation vessel in direct alignment below said condenser tubes;

(f) a plurality of condensing vanes for condensing said vapor component into a liquid component, said condensing vanes communicating with said distillation vessel through a ventilation circuit to receive a steady flow of said vapor component;

(g) Purification means for purifying said liquid component received from said condenser tubes and said condensing vanes, said purification means including a reverse osmosis unit, a deionizer unit or an activated carbon filter;

(h) aspiration vacuum means for drawing said liquid component recovered from said condenser tubes and said condensing vanes into said purification means;

(i) said aspiration vacuum means additionally providing a vacuum inside said distillation vessel;

(j) pH control means for controlling the pH level of said liquid waste to a range of between 5.5 to 6.5, prior to its introduction into said distillation vessel;

(k) ozone and nitrogen gas infusion means for controlling bio-slime within said liquid component;

(l) ozone and nitrogen gas infusion means and liquid component chilling means for controlling escape of hazardous gasses from said system;

(m) microprocessor control means for controlling the operation or said distillation vessel.

* * * * *